Figure 1:
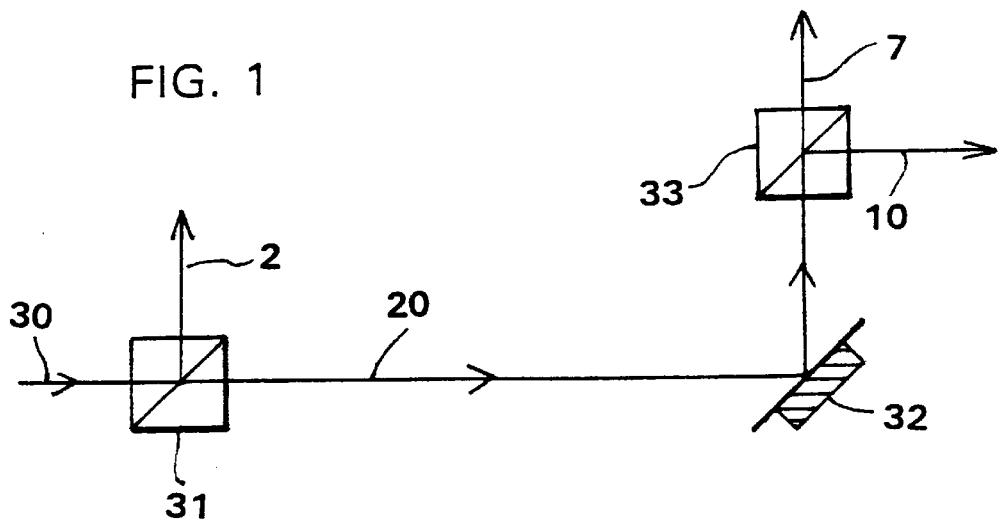

United States Patent
Dausmann et al.

[11] Patent Number: 5,943,131
[45] Date of Patent: Aug. 24, 1999

[54] METHOD FOR CHECKING AUTHENTICITY OF A HOLOGRAM AND A READING DEVICE FOR THE PERFORMANCE OF THE METHOD

[75] Inventors: Gunther Dausmann; Zishao Yang, both of Erding, Germany

[73] Assignee: HSM Holographic Systems Munchen GmbH, Germany

[21] Appl. No.: 09/082,668

[22] Filed: May 21, 1998

[30] Foreign Application Priority Data

May 22, 1997 [DE] Germany .............................. 197 21 525

[51] Int. Cl.$^6$ ........................................................ G01B 9/02
[52] U.S. Cl. ............................................ 356/347; 356/354
[58] Field of Search .................................. 356/35.5, 347, 356/359, 354

[56] References Cited

U.S. PATENT DOCUMENTS

| | | | |
|---|---|---|---|
| 5,166,742 | 11/1992 | Kobayashi et al. | 356/347 |
| 5,508,801 | 4/1996 | Panin et al. | 356/347 |
| 5,515,183 | 5/1996 | Hashimoto | 356/347 |

FOREIGN PATENT DOCUMENTS 19541071  5/1997  Germany .

*Primary Examiner*—Robert H. Kim
*Attorney, Agent, or Firm*—Ostrolenk, Faber, Gerb & Soffen, LLP

[57] ABSTRACT

A method for determining the authenticity of a hologram with the following steps:

a) The hologram (1) to be checked is illuminated with a restoration ray (2);

b) The diffraction ray (3) of the first order of the wave field created at the hologram is imaged on a first photo-sensitive element, in particular a CCD target (5), and brought to interference with a first reference ray (7);

c) The diffraction ray (4) of the zeroth order of the wave field created at the hologram (1) is imaged on a second photo-sensitive element, in particular a CCD target (6) and brought to interference with a second reference ray (10);

d) The intensity distributions created at the different photo-sensitive elements (5, 6) are correlated with each other for at least two phase relationships between the restoration ray (2) and the different reference rays (7, 10) to obtain a correlation intensity distribution for the relevant orders of diffraction; and e) The correlation intensity distributions determined for the relevant orders of diffraction are correlated with each other, particularly subtracted from each other pixel by pixel.

13 Claims, 1 Drawing Sheet

METHOD FOR CHECKING AUTHENTICITY OF A HOLOGRAM AND A READING DEVICE FOR THE PERFORMANCE OF THE METHOD

The present invention relates to a method for checking authenticity of a hologram and to a reading device for the performance of the method.

Holograms are used in particular in the form of embossed holograms increasingly on identity papers and to ensure authenticity on brand articles. It is desirable in this to be able to check the authenticity of a hologram electronically.

From DE 195 41 071 a method is known where the authenticity of a hologram to be checked is determined by means of a reading hologram. In this process, the hologram to be checked is illuminated by a restoration ray to restore a wave-front with which the reading hologram is illuminated. In this way, a correlation wave-front is created at the reading hologram. The intensity of this correlation wave-front is highly dependent on positional tolerances between the hologram to be checked and the reading hologram. For this reason, the intensity of the correlation wave-front is determined in dependence on a relative shift between the hologram to be checked and the reading hologram. In the case that the hologram to be checked is authentic, an intensity peak of the wave-front is obtained here which is larger by a certain factor than the other intensities measured.

The intensity of the wave-front resulting at the hologram to be checked and thus the correlation wave-front is, however, highly dependent on the flatness of the substrate on which the hologram to be checked is applied. If, for example, the hologram to be checked is applied on a paper substrate, the unevenness features of the paper can have such an effect that the correlation peak can no longer be determined in the method described above. This is particularly the case when a hologram of a randomly structured optical element, for example a frosted screen or a diffuser, is used as the hologram to be checked.

It is therefore the object of the present invention to describe a method by means of which it is also possible to easily determine the authenticity of holograms which are applied to an irregular or uneven substrate.

This object is solved by methods using the features of claims 1 and/or 2 and a reading device with the features of claim 8.

The invention utilises the fact that when a hologram to be checked is irradiated, the diffraction resulting from the hologram structure is essentially diffracted to the first order of diffraction. However, radiation reflected at uneven areas of the substrate are also scattered in the direction of the first order of diffraction. This leads to an impairment in the hologram signal or the hologram information in the first order of diffraction. Simultaneously, the greater part of this scattered radiation caused by unevenness of the substrate is reflected or scattered in the direction of the zeroth order of diffraction. Moreover, the unevenness structures are substantially coarser than the fine hologram structures so that the "scattered radiation pattern" caused by the unevenness possesses substantially lower spatial frequencies than the image of the hologram.

Thanks to a computer-controlled correlation of the radiation scattered in the relevant orders of diffraction, it is possible in accordance with the invention to isolate the actual hologram information from the radiation diffracted in the direction of the first order of diffraction of the hologram or to eliminate the scattered radiation caused by irregularities in the substrate surface.

The invention proposes two methods for the computer correlation of the radiation diffracted in the first or zeroth order of diffraction. In a preferred method, the radiation diffracted or scattered in the first or zeroth order of diffraction of the hologram is brought to interference in each case with reference rays. The interference patterns created in this way are correlated with one another for different phase relationships between restoration ray and reference rays. Finally, the correlation intensity distributions of the relevant orders of diffraction obtained in this way are correlated to one another, and are particularly subtracted from one another pixel by pixel.

It is, however, also possible to use digital speckle correlation methods. For this purpose, for each order of diffraction at least two speckle intensity distributions are recorded and correlated with one another. The relevant speckle intensity distributions of one order of diffraction differ, for example, by the phase relationship between restoration ray and the hologram to be checked. This phase relationship can be modified simply by a corresponding shift relative to the restoration ray of the hologram. The correlation speckle intensity distributions determined for the relevant orders of diffraction can also be subtracted from one another pixel by pixel.

With the methods in accordance with the invention and the reading device, it is now possible to simply determine the authenticity of holograms which are also applied to substrates with an uneven surface.

Advantageous embodiments of the invention are the subject of the dependent claims.

In accordance with a preferred aspect of the invention, the hologram to be checked is a hologram of a randomly structured optical element. Holograms of this kind are used widely in safety technology as they can only be counterfeited with great difficulty. With the method in accordance with the invention, it is now possible also to check such holograms with regard to the authenticity easily electronically.

Appropriately, the hologram to be checked is the copy of a master hologram. Such holograms can be manufactured easily, for example by embossing the relief structure of the master hologram into a suitable substrate. With the method in accordance with the invention, now such embossed holograms, which are embossed into a substrate with an irregular surface, can be easily read electronically. The method in accordance with the invention proves to be particularly advantageous for the electronic reading of holograms embossed in paper or cardboard.

Appropriately, the diffraction ray of the first order and the diffraction ray of the zeroth order are expanded by means of a telescope system or an expanding optical element. In this way, it is possible to image fairly small areas of a hologram to be checked on larger area CCD targets. In this way, CCD targets, which possess a relatively low resolution capability, can be used effectively as sensor elements for relatively finely resolving hologram information structures.

Appropriately, the first and the second reference rays and the restoration ray are derived from a laser beam by means of at least one beam splitter. In this way, the computer effort required to correlate the information scattered in the different orders of diffraction is simplified.

It is preferred to bring the reference rays and the diffraction rays allocated to them to interference by means of prisms and/or half-silvered mirrors. In this way, it is possible to bring the reference rays and the diffraction rays into interference at a relatively low angle, by means of which the maximum spatial frequencies which occur can be kept relatively low. Such prisms or mirrors can simultaneously be swivelled or positioned in a simple manner so that the different angles can be adjusted between the reference and diffraction rays. In this way, the spatial frequencies which occur can be adapted optimally to the resolution capability of the CCD elements used. Prisms or mirrors can also be used advantageously as beam splitters, for example to split a laser beam used.

In accordance with an advantageous embodiment of the reading device, the imaging optics possesses a beam-expanding optical element. In this way, it is possible to use CCD elements which possess a relatively low resolution as photo-sensitive elements.

Appropriately, the apparatus possesses prisms and/or half-silvered mirrors by means of which the diffraction rays can be brought into interference with the corresponding reference rays. Such combiners can be swivelled or positioned easily so that a fine adjustment of the imaging optical element is possible.

Appropriately, the hologram to be checked and/or the photo-sensitive elements are supported in a positionable manner in the reading device and provided with a positioning drive. In this way, a fine adjustment or orientation of the hologram to be checked can be performed easily with regard to the photo-sensitive elements.

The reading device advantageously possesses a piezo-electric mirror to modify the phase relationship between the restoration ray and the reference rays.

Advantageously, the reading device possesses a laser which serves to generate the restoration ray and the reference rays.

Figure 2:
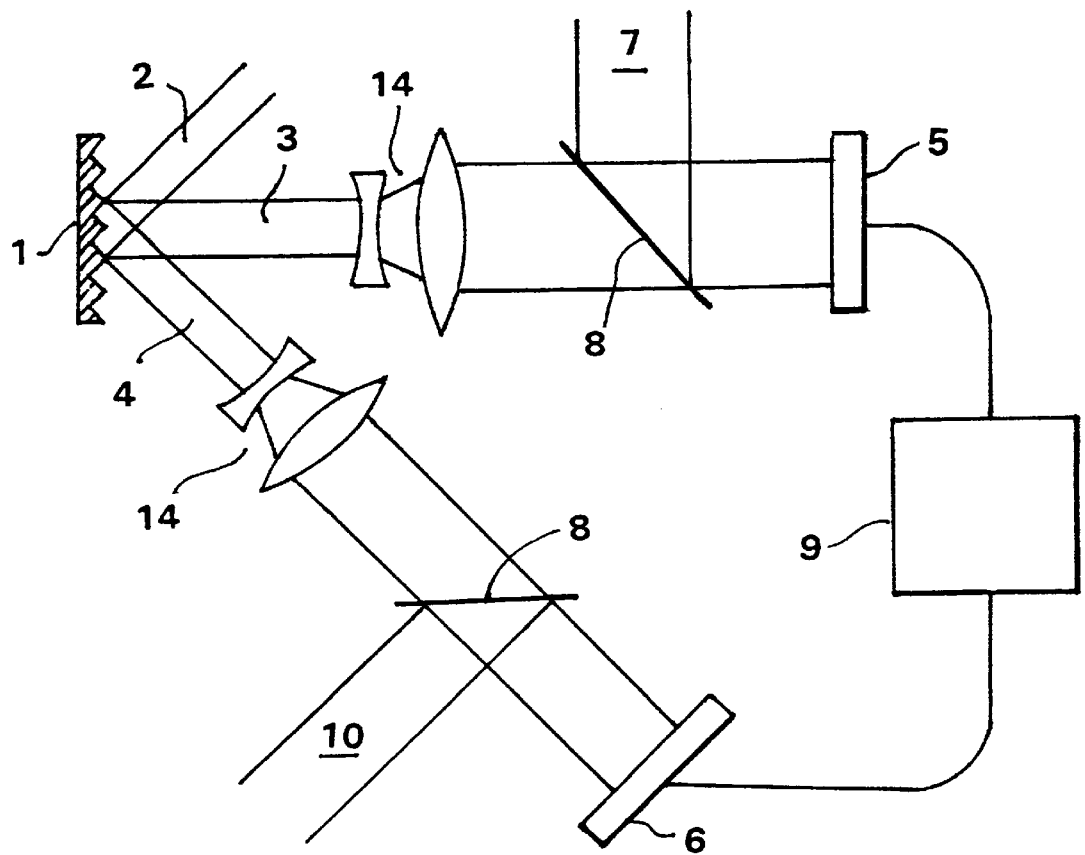

One embodiment of the invention is now described in greater detail by means of the drawing in which FIG. 1 shows a schematic view of an arrangement to generate a restoration ray and reference rays by splitting a laser beam, and FIG. 2 shows a schematic view of one embodiment of an imaging optical element for the performance of the method in accordance with the invention.

A laser beam 30 is split by means of a first beam splitter 31 into a restoration ray 2 and another ray 20 (FIG. 1). The ray 20 is guided by a piezoelectric mirror 32 to a second beam splitter 33 by means of which reference rays 7, 10 are generated.

By means of a piezoelectric shift of the piezoelectric mirror 32, the phase of the reference rays 7, 10 can be displaced with regard to the phase of the restoration ray 2 while the phase of the reference rays 7, 10 with respect to each other remains the same.

Now, first patterns or intensity distributions are recorded on the CCD targets 5, 6. For this purpose, a hologram to be checked 1 is illuminated by the restoration ray 2. By the interaction of the restoration ray with the hologram structure a diffraction ray of the first order (shown by reference symbol 3) and a diffraction ray of the zeroth order (shown by reference symbol 4) are created. The diffraction rays 3, 4 are each expanded by means of a telescopic lens system 14 to a desired size. The lens systems 14 shown each possess one diverging lens and one converging lens. Naturally, other telescopic lens systems, for example systems which possess two converging lenses, can be used.

After expansion, the diffraction ray of the first order impacts the CCD target 5 and the diffraction ray of the zeroth order the CCD target 6. On these CCD targets 5, 6, the diffraction rays of the first and zeroth orders are brought into interference with the first reference ray 7 or the second reference ray 10. For this purpose, ray combiners, particularly prisms or half-silvered mirrors 8, are provided in the beampaths of the relevant diffraction rays. In this way, it is possible to design the angle between the axes of the relevant diffraction rays and the axes of the associated reference rays to be relatively low which allows the spatial frequencies of the interference patterns which occur maximally on the CCD targets to be limited. It is equally possible to bring the diffraction rays into interference with the reference rays without using any such beam splitters or combiners.

By means of the CCD targets 5, 6, the intensity distributions of the first images or interference patterns generated in this way can be recorded and forwarded to a computer 9 by means of an A/D converter (not shown).

Now, second images or interference patterns are recorded in the same way on the CCD targets 5, 6. In this process, however, the phases of the reference rays 7, 10 are displaced over the phase of the restoration ray 2 by means of the piezoelectric mirror 32.

The out of phase interference patterns or images measured at the relevant CCD targets are now correlated with each other in the computer. The data obtained in this way for the first order of diffraction and the zeroth order of diffraction can now be subtracted from one another, particularly pixel by pixel. In this way, hologram information which is diffracted in the first order of diffraction can be isolated in a reliable manner from background effects such as the radiation caused by the unevenness of the substrate. It is then possible in a simple way to compare the information obtained for the hologram to be checked with, for example, corresponding information of the master hologram or a copy of the master hologram known to be authentic.

It must also be mentioned that to increase the sensitivity of the method, more than two "out of phase" records of the hologram to be checked can also be made. Particularly preferred here are methods with 3 or 4 different records where the computer effort for the computer correlation of the out of phase interference patterns can be performed in a relatively non-complex manner.

It must also be pointed out that effects caused by path differences of the diffraction ray of the zeroth order can also be eliminated by the computer.

It is also possible to present modified interference patters determined by the computer visually so that a viewer can compare this interference pattern with a correspondingly visually presented interference pattern of a hologram known to be authentic.

We claim:

1. A method for determining the authenticity of a hologram characterised by the following steps:

a) The hologram (1) to be checked is illuminated with a restoration ray (2):

b) The diffraction ray (3) of the first order of the wave field created at the hologram is imaged on a first photo-sensitive element, in particular a CCD target (5), and brought to interference with a first reference ray (7);

c) The diffraction ray (4) of the zeroth order of the wave field created at the hologram (1) is imaged on a second photo-sensitive element, in particular a CCD target (6) and brought to interference with a second reference ray (10);

d) The intensity distributions created at the different photo-sensitive elements (5, 6) are correlated with each other for at least two phase relationships between the restoration ray (2) and the different reference rays (7, 10) to obtain a correlation intensity distribution for the relevant orders of diffraction; and e) The correlation intensity distributions determined for the relevant orders of diffraction are correlated with each other, particularly subtracted from each other pixel by pixel.

2. A method for determining the authenticity of a hologram, characterised by the following steps:

a) The hologram (1) to be checked is illuminated by a restoration ray (2);

b) The diffraction ray (3) of the first order of the wave field created at the hologram is imaged on a first photo-sensitive element, in particular a CCD target (5);

c) The diffraction ray (4) of the zeroth order of the wave field created at the hologram is imaged on a second photo-sensitive element, in particular a CCD target (6);

d) The speckle intensity distributions of the diffraction rays of the first and second orders imaged on the photo-sensitive elements are determined for at least two phase relationships of the restoration ray and correlated with each other to obtain a correlation speckle intensity distribution for the relevant order of diffraction;

e) The correlation speckle intensity distributions determined for the relevant orders of diffraction are correlated with each other, particularly subtracted from each other pixel by pixel.

3. A method in accordance with claim 1 wherein a hologram of a randomly structured optical element is used as the hologram to be checked.

4. A method in accordance with claim 1 wherein the hologram to be checked is the copy of a master hologram.

5. A method in accordance with claim 1 wherein the diffraction rays (3, 4) of the first and zeroth orders are optically expanded by means of a telescope system or an expansion optical element (14).

6. A method in accordance with claim 1 wherein the first and the second reference rays (7, 10) and the restoration ray (2) are derived from a laser beam by means of at least one beam splitter.

7. A method in accordance claim 1 wherein the reference rays (7, 10) are brought to interference with the relevant diffraction rays by means of prisms and/or half-silvered mirrors (8).

8. A reading device for the checking of holograms characterised by an apparatus (30) to generate a restoration ray (2) to illuminate a hologram (1) to be checked;

an imaging optical element (14, 8) to image the diffraction ray (3, 4) of the first and zeroth orders of the wave field created at the hologram (1) on first and second photo-sensitive elements, in particular CCD targets (5, 6);

an apparatus (30) to generate first and second reference rays (7, 10) which can be brought to interference with the diffraction rays (3, 4) by means of an imaging optical element;

means (32) to modify the phase relationship between the restoration ray (2) and the corresponding reference rays (7, 10); and means for the computer correlation of the interference pattern intensities determined at the photo-sensitive elements (5, 6).

9. A reading device in accordance with claim 8 wherein the imaging optical element possesses a beam expanding optical element (14).

10. A reading device in accordance with claim 8 wherein the imaging optical element possesses prisms and/or half-silvered mirrors (8) by means of which the diffraction rays can be brought to interference with the corresponding reference rays.

11. A reading device in accordance with claim 8 wherein the hologram (1) to be checked and/or the photo-sensitive elements (5, 6) are supported in a positionable manner and provided with a positioning drive.

12. A reading device in accordance claim 8 characterised by at least one piezoelectric mirror (32) by means of which the phase relationship between the restoration ray (2) and the reference rays (7, 10) can be changed.

13. A reading device in accordance claim 8 wherein a single laser (30) serves to generate the restoration ray (2) and the reference rays (7, 10).

* * * * *